MAGNETIC CONTROL CIRCUITS

Filed May 2, 1958 2 Sheets-Sheet 1

INVENTORS T. H. CROWLEY
U. F. GIANOLA
BY
William H. Kamitia
ATTORNEY

Dec. 6, 1960 T. H. CROWLEY ET AL 2,963,591

MAGNETIC CONTROL CIRCUITS

Filed May 2, 1958 2 Sheets-Sheet 2

INVENTORS T. H. CROWLEY
U. F. GIANOLA

BY

William H. Kamstra

ATTORNEY

United States Patent Office 2,963,591

Patented Dec. 6, 1960

2,963,591

MAGNETIC CONTROL CIRCUITS

Thomas H. Crowley, Madison, and Umberto F. Gianola, Florham Park, N.J., assignors to Bell Telephone Laboratories, Incorporated, New York, N.Y., a corporation of New York Filed May 2, 1958, Ser. No. 732,549

19 Claims. (Cl. 307—88)

This invention relates to information processing circuits and more particularly to such circuits in which magnetic memory devices are employed as basic information storage elements.

Magnetic memory elements in which information is stored in the form of representative magnetic states are well known and have gained wide prominence in the data processing and switching art. Their extreme reliability, stability, and ease of maintenance have earned for such elements as, for example, the well-known toroidal ferrite cores, a favorable position in the binary information handling field. The ferromagnetics of which such cores are formed display substantially rectangular hysteresis characteristics and a binary information bit may be stored in a core as one or the other condition of remanent magnetization. The core then remains in the representative remanent condition until an applied magnetomotive force switches the core to the opposite remanent condition during the read-out phase of the information handling operation as is also well known.

Magnetic cores have been employed in numerous applications of specific circuits, and such arrangements as memory matrices, delay lines, and logic circuits, to name a few, are amply represented in the art. All of these applications have made highly advantageous use of magnetic cores. However, as is to be expected, many of the known circuit configurations have necessitated some modification in view of the inherent characteristics and manner of operation peculiar to the ferrite cores. Thus, for example, it is obvious that the switching of a core from either of its conditions of remanent magnetization to the other induces, a windings inductively coupled thereto, output voltages of equal amplitudes but opposite polarities depending upon whether the core is being "set" or "reset." In circuits operating repetitively, such as core logic circuits, the flux in a core must be reversed an even number of times with the result that for every forward transfer of information, that is, a flux reversal in one direction, there will also be a backward transfer of information, that is, a flux reversal in the opposite direction. Such a backward transfer is, in many instances, undesirable and must be countered in some manner. In a series arrangement in which each core is connected to an adjacent core by means of coupling loops and in which the cores are switched sequentially, such a backward transfer caused by the switching of one core may well, in fact, prevent the setting of a preceding core.

Normally in core logic circuits, for example, the above inherent effects are reduced and maintained within operating limits by the use of isolating diodes and also by suitably selecting the turns ratios of the core input and output windings. However, in connection with the former expedient, for obvious reasons it frequently becomes advantageous to reduce to a minimum the number of additional components, such as diodes, which are introduced into a circuit arrangement. One approach to this problem has been the use of a magnetic structure in which the problem of back transfer does not arise. Thus, in one well-known core geometry the closed flux loop is split at one side of the main aperture by providing a second aperture through the core body. Flux then, after passing through a main leg of the flux path, is divided between two subordinate legs formed by the additional aperture. By inductively coupling one winding to the main leg and two subordinate windings to one of the subordinate legs, in one mode of operation, transfer of signals between the subordinate windings may be accomplished under the control of signals applied to the winding coupled to the main leg. Thus, if the magnetic flux through the main leg is completed through the subordinate legs in opposite directions, representative of one binary information value, transfer of signals between the subordinate windings will be indicative of that value. If, however, the magnetic flux through the main leg be in a state other than that representative of the one information value, the flux will be divided between the subordinate legs in the same direction, thereby preventing the necessary flux coupling to effect a transfer of signals between the subordinate windings. The absence of output signals in the latter case will, accordingly, indicate the presence in the core of the other binary information value. Interrogation of a core may, in the foregoing manner, be accomplished non-destructively, that is, without completely switching the remanent flux in the main leg of the flux circuit in the core representative of the particular binary value.

In the known multi-apertured core arrangement generally described above, however, a familiar operational limitation is encountered. As was the case with respect to the expedient of properly selecting the turns ratios of windings coupled to the toroidal cores to prevent back transfer of information due to destructive read-out referred to hereinbefore, critical limitations apply to the character of the drive currents usable with the structure. In both cases the magnitude of the operational currents applied to the windings of the magnetic structure must be controlled within limits such as not to cause unwanted flux reversals or changes within the structure, or, in the case of individual toroidal cores, in cores other than the one being operated upon. The foregoing limitations, inherent in conventional toroidal core and known multi-apertured core structures generally, are well known and present important considerations in any attempt to increase interrogation and switching speeds by increasing the magnitude of the driving currents. Further, experience with known square loop ferrite structures has demonstrated that temperature changes encountered during normal circuit operation may require driving currents of magnitudes going beyond the permissible limits set by the restricted flux action demanded in particular circuit applications.

Accordingly, it is an object of this invention to provide a new and improved magnetic information handling device.

Another object of this invention is the isolated treatment of information at one place in a magnetic information handling circuit without disturbing information present at other locations within the circuit.

Yet another object of this invention is the provision of a magnetic structure adaptable for use in information handling circuits to realize a substantial reduction in circuit components.

It is still another object of this invention to provide a magnetic structure of a character such as to permit a wider margin in permissible drive current characteristics than has heretofore been possible with known magnetic storage devices.

A further related object of this invention and one based on the wider current margins made available through the realization of the immediately foregoing object is to provide such a magnetic structure which tolerates a greater range of temperature changes than is possible with conventional core devices.

A still further object of this invention is the generation of arbitrary Boolean functions of *n* binary variables in a novel and more economical manner.

Another object of this invention is to provide a new and more simple logic switching circuit capable of performing any logic operation, which circuit is completely compatible with known information handling systems generally.

The principles of this invention in accordance with which the foregoing and other objects are realized, may be better understood from a general description of an illustrative embodiment thereof. Such an embodiment comprises a ferrite magnetic structure displaying substantially rectangular hysteresis characteristics, which structure in turn comprises a pair of side rails having a plurality of transverse members disposed in a spaced relationship therebetween. A substantially ladder-like structure is thus presented and it may be convenient for purposes of description to regard the transverse members as rungs of such a ladder. The side rails, together with the rungs, present a plurality of closed magnetic flux paths and it is obvious that any flux induced in the first rung of the structure by an applied magnetomotive force may be completed in whole or in part through the side rails and through any other rung including the last rung of the structure. Which rung is actually used for flux completion will depend upon which rungs are available, as will be explained hereinafter.

Each of the rungs, and advantageously though not necessarily, each of the side rails is flux limited. That is, more specifically, in the normal case a minimum cross section of each of these elements is held to a predetermined fixed dimension such that each element is limited in flux capacity in predetermined multiples of a particular flux value. As a result, an important feature of this invention is achieved whereby a flux induced in one of the rungs is completed through a flux path defined by the nearest rung through which a flux can pass without regard to the magnitude of the applied magnetomotive force. As will be described in detail hereinafter, this feature makes possible the generation of logic functions in an illustrative logic circuit without regard to critical drive current limitations as has been necessary heretofore, with obvious advantages in terms of higher operating speeds and wider operating margins.

For purposes of describing the principles of this invention in general terms, an illustrative structure having a first, a second and third, and a last rung will be assumed. Inductively coupled to the first and last rungs respectively are an activating winding and an output winding, and reset windings are coupled in a series relationship to bridging portions of one of the side rails between the first and second rungs, and third and last rungs, respectively. In addition, the second rung also has an input winding coupled thereto. Assuming in the structure a complete absence of magnetization, when a first reset current pulse is applied to the serially connected reset windings, which windings are coupled to the side rails in the same sense, the resulting magnetomotive force will induce an initial magnetization in the flux path defined by the first and second rungs and also in the flux path defined by the third and last rungs. The flux thus established in each path will be in the same direction, that is, rungs one and three will be magnetized in one direction and rungs two and four will be magnetized in the opposite direction. Furthermore, the bridging portions of the side rails between rungs two and three also present closed flux loops in each of which a closed flux may be regarded as established. If an activating current pulse is now applied to the winding of the first rung in a direction such as to switch the flux direction in that rung, substantially all of the new flux will be completed through rung two and the flux direction in the latter rung will be reversed. In accordance with the feature of this invention previously mentioned, the switching flux will be completed through rung two no matter what the amplitude of the activating current applied. In other words, the voltage induced across the winding of the second rung during the above flux switch corresponds to virtually a complete flux reversal in rung one.

Assume, in the next step in the development of the principles of this invention, that, simultaneously with the application of the activating current pulse to the winding of rung one, a current is also applied to the winding of rung two in a direction such that the magnetomotive force developed thereby will hold the flux in rung two in the direction in which it was initially magnetized. The switching flux induced in rung one by the applied activating current will now, in accordance with another feature of this invention, be denied access to the path defined by rung two since now no flux switching can occur in the latter rung. The next shortest flux path is that presented by rung three. However, from the viewpoint of the switching flux, this path is also unavailable. The direction of flux through the latter rung, it will be recalled, is already in the direction of the switching flux, and, more importantly, this rung, because of its flux carrying limitation, is already completely saturated and accordingly offers a reluctance approximating that of air to the switching flux. The closest flux path left available in which the switching flux may be completed now is that defined by the last rung and here flux switching can occur. The switching flux is accordingly completed through the latter rung and an output voltage is induced in the winding coupled to that rung by the flux reversal. Upon the application of a subsequent reset current pulse to the reset windings, the flux in the various paths of the rungs will be restored to that described above for the initial magnetic state of the structure.

It should be noted, however, that complete reversal of flux in the last rung does not take place. Since all of the paths in the structure are flux limited, either those now occupied by the completing portion of the flux present in rungs two and three must remain partially or wholly unavailable, or new paths for the completing flux must be provided. The flux in rung three remains undisturbed by the switching flux as explained above and may be understood as now being completed equally through rung two and the last rung. The flux in the last rung can accordingly be only partially affected by the completion of the flux switched in rung one. It follows also that in view of the restricted paths available for the introduction of flux of a new direction as just described, the flux in rung one can also be only partially switched no matter what the magnitude of the activating current pulse. The extent to which the initial remanent flux in rung one may be switched accordingly depends entirely upon the paths available in the structure for the flux of the new direction.

To facilitate the description of the operation of this invention the remanent flux in each of the rungs of the illustrative structure may be advantageously thought of as being actually divided into the quantitative multiples referred to hereinbefore and, further, that each of these multiples may be independently reversed in direction. Obviously, the operation of the present invention may also readily be described in terms of the conventional hysteresis loop which graphically represents the magnetic flux switching phenomenon. In the latter case, the partial switching of the flux in rungs one and four would be represented as an excursion of the entirety of the flux from a point of remanence of the B axis of the loop to some point in the direction of opposite remanence. Since in the illustrative arrangement being generally described, the opposing magnetomotive forces in those rungs are of equal magnitude, the flux excursion in each would be substantially to a point on the H axis of the loop. That is, rungs one and four are effectively demagnetized after the application of an activating current pulse.

According to one aspect of this invention, it is another feature thereof that the structure and manner of operation as described in the foregoing, advantageously comprises a logic circuit performing an AND function. Thus, if the activating current pulse applied to the winding of the first rung is considered to represent a first variable $x$ and the current pulse applied to the winding of the second rung represents a second variable $y$, then an output will result only if $x$ occurs during $y$. By extending the structure to include additional rungs, a much wider range of variables than that described may be handled. Also, by providing more than one winding on a rung and considering the current pulse applied to the winding of the first rung only as an activating or clock pulse, OR functions may be performed.

Another feature of this invention makes possible the employment of the ladder structure as a memory device. As described above, a plurality of input variables may be combinatorially introduced into the structure to produce an output signal when a function has been successfully generated. The resulting rearrangement of the existing flux in the various flux paths, however, remains due to the remanent property of the ferrite material. Only a reset current pulse applied to the reset windings in the illustrative structure being considered will serve to restore the various flux loops to their initial pattern. This reset current pulse may be timed to occur after any interval as determined by the memory requirements of the particular circuit application. When the flux is ultimately restored to its initial condition, an output voltage will again be generated across the winding of the last rung in the opposite direction and this latter output voltage will also be representative of the function generated earlier.

An important feature of this invention is the manner in which input variables may be introduced into the circuit. As previously explained, no upper limit as far as the magnetic structure is concerned, exists for any of the operational current pulses applied to the various windings of the structure. For the windings which must actually perform a flux switching function, the conventional condition obtains that the applied current pulse be of a minimal value such that the necessary flux switching may be completed. However, the current pulses representing input variables applied to the windings of the rungs in which the flux need merely be maintained in a particular remanent direction, need only be of a value such as to accomplish this flux holding function. Since these current pulses perform no actual flux switching, a considerable saving in the power requirements may be realized over conventional core circuits where some flux switching must in any event occur.

An additional feature of this invention is realized in the fact that single turn windings may advantageously be used for the rungs, whether a switching or a holding function is to be accomplished. In many conventional magnetic core circuit applications where the required switching operation of a core is dependent upon the appropriate selection of turns ratio of the windings, on the other hand, multi-turn windings have invariably been necessary. Accordingly, the construction and assembly of magnetic logic circuits employing the structure of the present invention in conjunction with printed circuit techniques and the like may be substantially simplified.

From the information input aspect of this invention another feature is presented in the isolation of the input operation with respect to each of the rungs in which a flux switching is to be controlled. Thus, in the generation of a function, the control of flux excursions in one rung will be unaffected by other flux excursions, or absence of such excursions, in other rungs. In effect, the flux in the rungs is controlled, that is, merely prevented from switching, only for the purpose of steering an induced switching flux to a particular path defined by a rung having an output winding inductively coupled thereto.

The foregoing and other objects and features of this invention, together with the organization and structure thereof, may be better understood from a consideration of the detailed description thereof which follows when taken in conjunction with the accompanying drawing, in which:

Figs. 1*a* and 1*b* depict an illustrative embodiment of this invention with the magnetic flux distribution symbolized therein at two stages of operation;

Figure 1A:
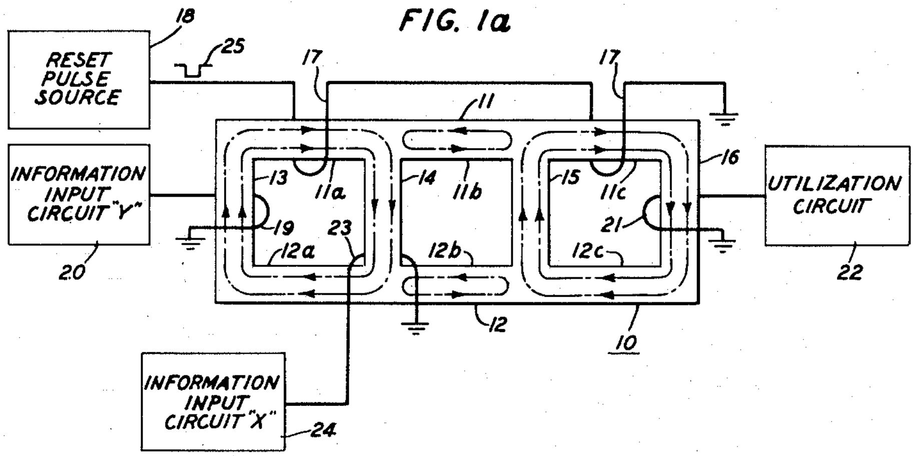
Figure 1B:
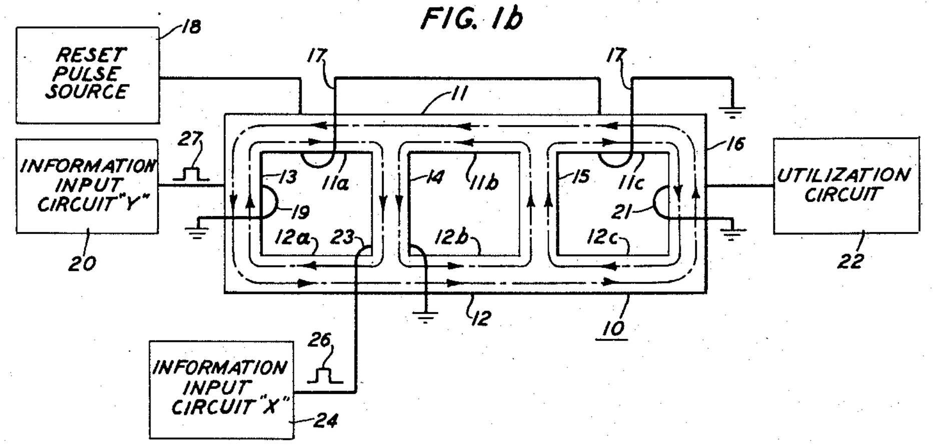

A specific illustrative embodiment of this invention is a logic circuit performing a simple AND function as shown in Figs. 1*a* and 1*b* of the drawing and comprises a magnetic structure 10 having a pair of side rails 11 and 12 and a plurality of transverse members 13 through 16. For the embodiment of this invention being described as representing the principles of this invention, each of the members or rungs 13 through 16 of the ladder-like structure 10 is formed of a magnetic material displaying substantially rectangular hysteresis characteristics, such as, for example, cadmium manganese ferrite. Each of the members 13 through 16 additionally is flux limited, that is, more specifically, in the normal case, each of the rungs has the same minimal cross-sectional dimensions such that each is limited to the same extent in its flux carrying capacity. In the embodiment presently being described, the side rails 11 and 12 are also advantageously but not necessarily of the same material and flux limited. Thus, the entire structure may conveniently be formed from a single sheet of stock by methods well known in the magnetic ferrite art.

A pair of reset windings 17 are inductively coupled to bridging portions of one of the side rails, such as the bridges **11*a* and 11*c* of the side rail 11. The latter windings 17 are serially connected between ground and a reset current pulse source 18. Coupled to the first member or rung 13 of the structure 10 is a winding 19 connected between ground and a source of input information 20 supplying one of the variables Y. The latter winding 19 may also serve an activating or clocking function in other embodiments to be described hereinafter. An output winding 21 is coupled to the last rung 16 of the structure 10, which winding 21 is connected between ground and an output signal utilization circuit 22. Finally, an input winding 23 is inductively coupled to the rung 14 and is connected between ground and a source of input information 24 supplying another of the variables X. In accordance with one of the features of this invention mentioned hereinbefore, each of the windings so far described may be single turn, thus facilitating considerably the assembly of the logic circuit. The current sources 18, 20, and 24 may conveniently comprise any of the sources well known in the art suitable for providing the necessary current pulses to be described. However, in view of the feature of this invention effectively eliminating upper margins for such currents, considerably more freedom is obviously exercisable in selecting the suitable power sources. The circuit 22** in which output signals generated by the logic circuit are utilized is also of a character well known to one skilled in the art. Accordingly, none of the associated circuits employed with the illustrative logic circuit requires detailed description for an understanding of this invention.

Assume that during a first operative phase a reset current pulse such as the negative pulse 25 is serially applied to the windings 17 from the reset pulse source 18. Referring to Fig. 1*a*, the sense of the windings 17 is seen to be such as to induce a magnetic flux in the structure 10 in a pattern as symbolized by the broken lines, with the arrows indicating the direction of flux. The flux distribution is shown as being divided into two parts in each flux path. At this point it is to be understood that the particular flux representation selected is employed only to facilitate the description of the effects of the flux action within the physical structure of the magnetic element and is not necessarily to be understood as representing the actual physical states obtaining in the structure during the operation of the switch. Thus, the operation of this invention may equally well be described in terms of well-known theories of magnetic phenomenon and, particularly, reference will also be had herein, where considered clarifying, to the conventional B–H hysteresis loop representing the excursion of flux from one condition of magnetic saturation to the other. The particular representation employed in Figs. 1*a* and 1*b* also serves to illustrate that all of the flux possible in the structure is physically restricted by the dimensions of the structure.

In accordance with the principles of this invention, the fluxes induced by the current pulse 25 will be completed via the shortest possible paths, which in the present case will be via the bridge **11*a*, rung 14, bridge 12*a*, and rung 13 for the first winding 17 and via the bridge 11*c*, rung 16, bridge 12*c*, and rung 15 for the second winding 17. Since the windings 17 are in the same sense, the induced flux in each closed path will be in the same direction, that is, up in the rungs 13 and 15 and down in the rungs 14 and 16**, as viewed in Fig. 1*a*. Each of the rungs 13 through 16 is flux saturated due to its flux limitation. The bridges **11*b* and 12*b*** each shows a minor closed flux loop and may obviously be assumed as in an unmagnetized state. Due to the remanent characteristic of the magnetic material the flux will remain in the distribution pattern as symbolized in Fig. 1*a* after the termination of the pulse 25 and the circuit is now prepared for the introduction therein of the information input variables.

The succeeding phase of operation may best be described with reference to Fig. 1*b*. An information input variable X is introduced as a representative current pulse 26 applied to the winding 23 coupled to the rung 14 from the source 24 at this time. The polarity of the pulse 26 and the sense of the winding 23 are such that the magnetomotive force generated drives and holds the flux in the rung 14 in the direction in which the previously applied reset pulse 25 has already set it. As a result, no flux reversal at all occurs or can occur in rung 14 at this time. Substantially simultaneously with the application of the pulse 26 to the winding 23, the information input variable Y is introduced as a representative positive current pulse 27 applied to the winding 19 coupled to the first rung 13 from the source 20. The polarity of the pulse 27 and the sense of the winding 19 are such that the magnetomotive force generated tends to drive all of the flux in the rung 13 in a direction opposite to that of its present state. The latter current pulse 27 may be designed to overdrive rung 13 to thereby increase switching speed and the current pulse 26 need provide only the power necessary to hold the rung 14 down, as viewed in Fig. 1*b*. The pulse 26 may also be a continuing D.C. current should this prove advantageous in particular circuit applications.

The extent to which the flux in rung 13 is reversed by the applied magnetomotive force will be determined by the available paths, if any, presented to the switching flux. The path defined by the rung 14 is completely unavailable as already explained since no flux reversal can take place. The next possible path is that through rung 15. However, it will be recalled that the latter rung is already saturated, and that, in the direction of the switching flux seeking a path for completion. The path through rung 15, as a result, is now also unavailable. Thus, the closest short circuit for the switching flux which remains is presented by the last rung 16. Flux reversal can take place in the latter rung and this follows as the switching flux is completed. However, because of the previously established condition that the paths through the rungs be flux limited, all of the flux in the rungs must still find paths for completion. Consequently the flux in rung 14 may, as a possible alternative, divide to complete itself partially through each of the rungs 13 and 15. In the same manner the flux in rung 15 may divide to complete itself partially through each of the rungs 14 and 16. Under the conditions as established by the applied operating curent pulses 26 and 27, the foregoing are the only paths available for a new flux distribution. Rungs 13 and 16, as a result can permit only a partial reversal of flux and this switching flux may be regarded as being completed through the latter rungs as shown in Fig. 1*b*. The partial switching of the flux in rung 16 induces an output voltage in the winding 21 coupled thereto, in the conventional manner, which voltage signal is applied to the utilization circuit 22. Obviously, the flux excursions in the rungs 13 and 16 may also be readily explained by reference to the conventional hysteresis loop in which case the flux state in the rungs 13 and 16, after the proper introduction of the input variables in the second phase of operation, would be represented as being substantially near the H axis, that is, unmagnetized. What has been described is the generation of a simple function given by the expression $F(X, Y)=XY$.

Should the input information not have corresponded to the function to be generated, that is, if X had not occurred during Y, the flux path defined by the rung 14 would not have been denied to a switching flux induced in rung 13 by the introduction of the variable Y. The flux circuit shown in Fig. 1*a* defined by the bridge **11*a*, rung 14, bridge 12*a*, and rung 13 would in that case contain the entire flux reversal induced, leaving undisturbed the flux in flux loops defined by other parts of the structure. The flux in rung 16 would also have been left undisturbed and no output voltage would be induced in the output winding 21**.

In the subsequent phase of operation of the logic circuit according to this invention, a reset pulse 25 is again applied to the windings 17 and the magnetic flux distribution is restored to the pattern as symbolized in Fig. 1*a*. Since a flux excursion takes place in rung 16 also during this phase of operation, an output signal is also induced in the output winding 21 at this time, although of the opposite polarity. Since the reset pulse 25 is applied during a succeeding operative phase subsequent to the introduction of the information input variables, the memory ability of the illustrative arrangement is clearly demonstrated. The output signals, separated in time, are both indicative of the generation of the function for which the circuit is intended and accordingly the output signals may be utilized to achieve either simultaneous or sequential operation, depending upon which of the output signals is accepted as controlling.

The principles of this invention are not confined to the generation merely of the simplified AND function described in connection with the operation of the embodiment of Fig. 1. By extending the structure of this invention to include additional rungs, the number of variables which may be handled may be substantially increased. Thus, additional windings similar to the input winding 23 of the arrangement of Fig. 1*b*, may be provided on alternating additional rungs to receive the additional variables to be multiplied. By adding additional windings to each of the rungs already having an input winding such as the winding 23 thereon, a logic circuit according to this invention may also be adapted to perform OR functions. With the foregoing expansion in the operative range of a simple logic circuit as shown in Fig. 1 in mind, a logic circuit employing the magnetic element of this invention capable of generating all functions of $n$ variables may now be described. It is well known that any Boolean function of $n$ principles can be expressed as a product of sums, that is, in the form $$F(X_1, X_2, \ldots X_n) = X_{11}+X_{12}+ \ldots X_{1n})(X_{21}+X_{22}+ \ldots X_{2n}) (X_{i1}+X_{i2}+ \ldots X_{ij})(X_{L1}+X_{L2}+ \ldots X_{Ln}) \quad (1)$$

In this form the symbol $X_{ij}$ stands for whichever of $X_j$, that is, the $j^{th}$ variable, or $X'_j$, that is, the negation of the $j^{th}$ variable is supposed to appear in the $i^{th}$ set of parentheses. The number, L, of factors appearing in this form depends on the function but is always less than $2^n$. Since the foregoing expression is readily generated by means of a single extension of the arrangement of Fig. 1, any Boolean function of $n$ variables can be generated provided only that current pulses are available for all of the variables and their negations which appear in the expression.

It is well known that if we let $L_1$ be the number of factors appearing in the above expression for a function F and $L_2$ be the number of factors appearing in the expression for F', that is, the negation of F, at least one of $L_1$ and $L_2$ is less than $2^{n-1}$. It follows accordingly that a logic structure having at most $2^n+1$ rungs will be required since two rungs must be added for each additional factor, the latter requirement resulting from the fact that, according to this invention, input windings are coupled only to alternate rungs. Furthermore, $n$ or less windings on $2^{n-1}$ of the rungs will be sufficient to produce the function.

The particular function representing the most difficult case from the viewpoint of the number of rungs and windings required is the alternating symmetric function. This function requires that $F=0$ in case an even number of the variables are 0 and requires that $F=1$ in case an odd number of the variables are 0. Thus, in the case when $n=3$, the function may be expressed $$F=(x+y'+z)(x+y+z')(x'+y+z)(x'+y'+z') \quad (2)$$

Figure 2:
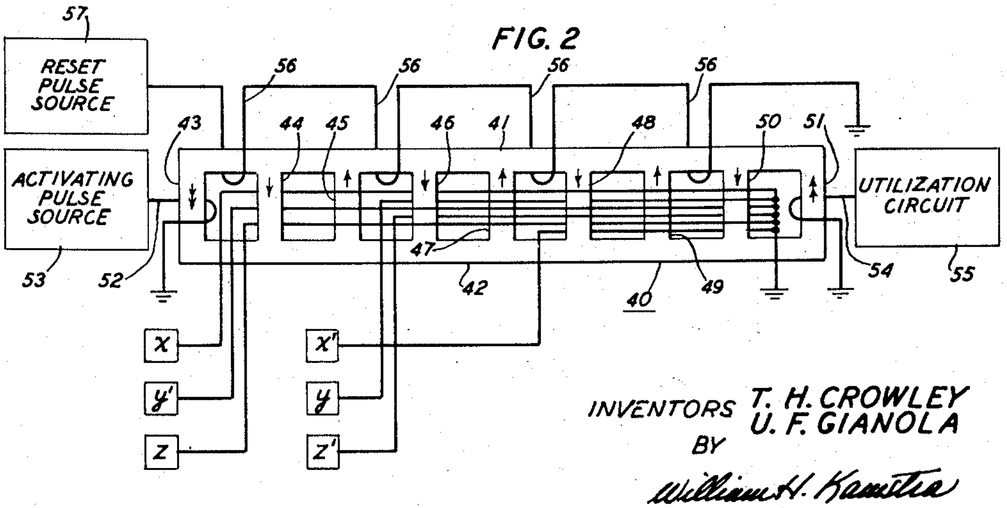
Fig. 2 shows another illustrative embodiment of this invention comprising a logic circuit capable of generating a generalized Boolean function of $n$ variables.

Consideration of the circuit shown in Fig. 2 demonstrates the generation of this function. The organization and operation of the circuit shown in Fig. 2 will be described without recourse to the symbolized flux distribution indicated in connection with the operation of the circuit of Figs. 1*a* and 1*b*. However, it will be assumed that a similar hypothetical flux distribution results after the application of the input variable currents and the reset current.

The arrangement of Fig. 2 also comprises a structure 40 having a pair of side rails 41 and 42 and a plurality of transverse members or rungs 43 through 51 in a spaced relationship therebetween. In the case being described the rungs number nine in accordance with the condition $2^n+1$ established hereinbefore. The side rails 41 and 42 and the rungs 43 through 51 each also display the magnetic hysteresis characteristics demanded for the corresponding elements of the arrangement of Figs. 1*a* and 1*b* as previously set forth herein. The latter elements are also flux limited in the manner also previously stated. An activating winding 52 is inductively coupled to the first rung 43 and is connected between ground and a source of activating current pulses 53. An output winding 54 is coupled to the last rung 51 and connected between ground and a utilization circuit 55. A plurality of reset windings 56 are coupled respectively to the bridging portions of the side rail 41 between the rung pairs 43—44, 45—46, 47—48, and 49—50. The latter windings are serially connected between ground and a reset current pulse source 57.

Each of the alternate rungs 44, 46, 48, and 50 has coupled thereto a plurality of input windings not specifically designated except by the information input variables to be introduced thereby. Thus, the input windings are connected between ground and the particular input current pulse sources supplying the representative holding currents. The latter sources are also designated simply by the particular information variable each serves to introduce into the circuit. Referring back to the expression of the function to be generated as stated previously herein, the first sum of the expression is seen as $(x+y'+z)$. Accordingly, coupled to the first switching rung 44, are windings connected to the sources $x$, $y'$, and $z$ supplying the corresponding holding currents. In the next rung 45, it will be recalled, saturation reluctance alone controls the possible flux excursions therein, as is the case with the succeeding rungs 47 and 49, and accordingly no windings are provided for these rungs. The next switching rung 46 has input windings coupled thereto corresponding to the next term of the illustrative expression. Thus, the latter windings are connected to the sources $x$, $y$, and $z'$. The rung 48 is coupled to input windings connected to sources $x'$, $y$, and $z$ corresponding to the third term of the expression. Finally, the rung 50 has inductively coupled thereto input windings connected to current sources $x'$, $y'$, and $z'$ corresponding to the last term of the expression. As shown in Fig. 2, where more than one input winding is connected to the same current source, they may advantageously be connected in series. It should be noted that in the pictorial representation of the arrangement of Fig. 2, the coupled windings are shown for simplicity as passing beneath the rungs and where the windings are not coupled to a rung they are shown as passing above the rungs. Obviously, in the actual assembly of such a switch the single turn windings will be threaded in a manner which proves most expeditious for the particular circuit application. The associated circuits 53, 55, and 57 may also comprise well-known circuits of the character previously described herein.

Assume that an applied reset current pulse from the source 57 has established a flux distribution in the side rails 41 and 42 and in the rungs similar to that described in connection with the arrangement of Fig. 1*a*, in a previous phase of operation. Rungs 43, 45, 47, and 49 may again be understood as being magnetized up as viewed in Fig. 2 and rungs 44, 46, 48, and 50 may be understood as being magnetized down also as viewed in Fig. 2. The circuit of Fig. 2 adds a rung 51 over the corresponding structure of Fig. 1*a* and the latter rung may be understood as having a closed flux path therein containing opposing magnetizations, that is, rung 51 is effectively zero magnetized. The circuit is now prepared for the introduction of the information input variables therein in accordance with the function to be generated. In this phase of operation, the sources $x$, $x'$, $y$, $y'$, $z$, and $z'$ are energized to supply the holding currents for the terms of the expression. In accordance with each of the OR terms, the multiple input windings on the rungs 44, 46, 48, and 50 are organized such that a current pulse on any one of the windings on a rung will succeed in holding the flux in that rung in its down direction as viewed in Fig. 2. Thus, in connection with rung 44, if any one of the windings $x$, $y'$, or $z$ is pulsed, the rung 44 will be denied to any switching flux. This is obviously in accord with the first term of the illustrative expression $$(x+y'+z)$$

Inspection of Fig. 2 will show that the same comparison exists for the multiple windings of the other rungs 46, 48, and 50 and the other terms of the expression. The flux in each of the rungs 44, 46, 48, and 50 will now be locked in its condition of magnetic saturation in which no reversal can occur, as indicated by the single-headed arrows in Fig. 2.

Simultaneously during the second operative phase of the circuit, an activating current pulse is applied from the source 53 to the activating winding 52 in a direction such as to tend to reverse the flux in rung 43. As was the case in the arrangement shown in Fig. 1*b*, the direction of the switching flux is that of the flux already in the saturated paths defined by the rungs 45, 47, and 49 and opposite to that of the flux in the paths defined by the rungs 44, 46, 48, and 50. This direction is also indicated in Fig. 2 by arrows. For reasons previously explained all of the last-mentioned rungs will be denied as closure paths for the switching flux being induced in the rung 43. Only the rung 51 is now available and accordingly the flux switched in rung 43 by the activating current pulse is completed through the former rung. The flux in rung 43 can, however, because of the flux limitation, be only partially switched and, as a result, only a partial flux excursion takes place in rung 51. This is completely in accord with the fact that rung 51 was previously effectively unmagnetized, viz., rung 51 has passed from a condition of no magnetization to one of remanent magnetization. The switching flux is represented by the double-headed arrows in Fig. 2. The flux excursion in rung 51 induces an output voltage in its winding 54 which is transmitted to the utilization circuit 55 as representative of the generation of the illustrative function. A subsequent reset pulse applied from the source 57 to the windings 56 will restore the circuit to its initial flux distribution. An output voltage will again be induced in the winding 54 as a result, which voltage may also be held as representing the generated function.

As previously stated, the embodiment of Fig. 2 represents an example of the functions which may be generated in a logic circuit according to this invention. The flexibility of the present logic circuits may be further demonstrated by translating the function to be generated into another form. Thus, the illustrative function, the generation of which was described above, may also be expressed in the form $$F=x(y'+z')(y+z)+x'(y+z')(y'+z) \qquad (3)$$

In this case each of the product terms may be generated in separate parallel sections of the switch, each employing a ladder structure according to this invention. The OR relationship connecting the two products may readily be carried out by simply connecting the output windings of the last rungs of each in series. An output voltage induced in either will accordingly indicate the function generated. For functions incorporating additional variables, additional sections may be added in parallel, also having the output windings thereof connected in series. Simultaneous activating current pulses may be applied to the activating winding of the first rung of each of the sections in the manner described above in connection with the embodiment shown in Fig. 2. By using more than one ladder section, the function performed by the latter logic circuit may be accomplished with less windings than there shown in the embodiment of Fig. 2. Each section in this case would require five rungs and each section would require five input windings, thereby saving two such windings over the total of twelve employed in the arrangement of Fig. 2. This manner of employing the magnetic elements of this invention may obviously prove advantageous in terms of windings saved, and this reduction in windings may be extended even further in other cases where the function permits.

Figure 3:
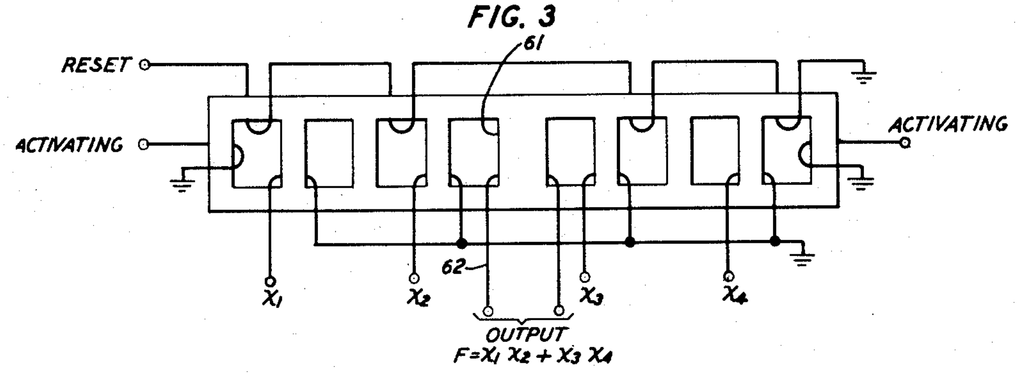
Fig. 3 shows in general form another illustrative embodiment of this invention for generating a sum-of-two-products Boolean function.

In connection with the sum of products function equivalent of the function performed by the logic circuit of Fig. 2, and any other function involving a sum of two products, a convenient means for still further simplification is shown in Fig. 3. This further simplification permits a return to a single structure having all of the advantages of the two-section arrangement just described. A generalized structure for performing a sum of products expression $F=x_1x_2+x_3x_4$ is shown in Fig. 3. The organization and structure of this arrangement is similar to that of the two-section arrangement previously described herein with the exception that the switching flux of each section shares a common rung 61 with the result that only a single output winding 62 is required. The dimension of the common rung 61 may either be such as to flux limit the rung to the same extent as that of the other rungs or the rung 61 may have a flux limit double that of the other rungs since a flux reversal in rung 61 produced by the switching flux in either side will effectively indicate the function generated.

Figure 4:
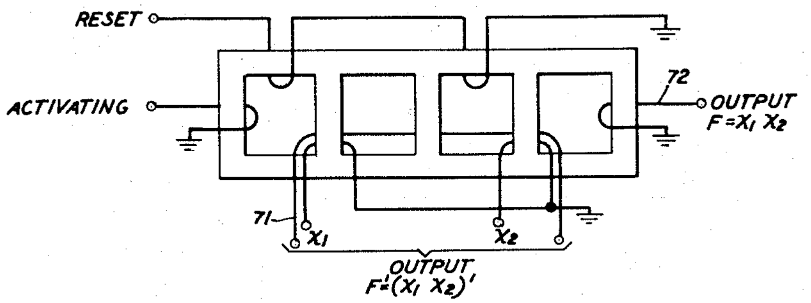
Fig. 4 shows in general form an illustrative embodiment of this invention adapted to generate the negation of a Boolean function.

In addition to generating any function of *n* variables as demonstrated above, a logic circuit employing an element according to this invention may also perform the negation of such a function. This may be accomplished on the same circuit which is used to perform the direct function as shown in the generalized circuit arrangement of Fig. 4. Thus, in that arrangement both the functions $F=x_1x_2$ and $F'=(x_1x_2)'$ may be generated. Referring to Fig. 4, it is seen that by inductively coupling an additional, negation output winding 71 to all but the first and last rungs, an output voltage will be induced in the output winding 71 only when no output voltage is induced in the output winding 72. Thus, the switching of flux in any of the coupled rungs indicating the function negation will result in an output voltage in negation output winding 71.

Figure 5:
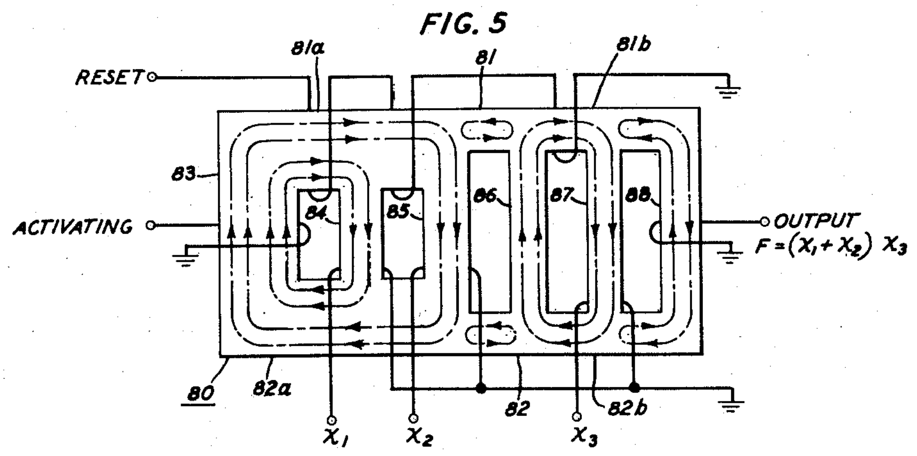
Fig. 5 shows an illustrative embodiment of this invention presenting a variant structural geometry.

The principles of this invention have been described in the foregoing as embodied in structures in which the side rails and transverse rungs have substantially the same cross-sectional dimension. This is in accord with the requirement stated that either the side rails or the rungs, or both, be flux limited. The principles of this invention are not confined, however, to structures of the particular configuration shown. Fig. 5, for example, shows a structure 80 having a geometry in which the side rails and rungs define flux paths in multiples of a particular flux magnitude. The flux distribution is again symbolized in the structure of Fig. 5 to clarify the multiple flux aspect and to recapitulate the flux limiting principles of this invention. The logic circuit of Fig. 5, as shown, is wired to generate the function $F=(x_1+x_2)x_3$ and comprises a pair of side rails 81 and 82 having a plurality of transverse members or rungs 83 through 88. All of the rungs are again flux limited, but as suggested in Fig. 5, the rung 83 has a cross-sectional dimension twice that of the other rungs. As a result, rung 83 will have a flux capacity twice that of the other rungs. Since the rungs 83 through 88 are represented as being flux limited, the side rails 81 and 82 need only be of a cross-sectional dimension such as to contain any of the flux switching required by the operation of the circuit. Thus, to provide paths for the fluxes shown as occupying rung 83 the bridges 81*a* and 82*a* of the side rails between rungs 83 and 85 must have a minimal cross-sectional dimension at least that of rung 83, that is, at least sufficient to contain twice the flux normally present in either of the rungs 84 or 85. The bridges 81*b* and 82*b* of the side rails between the rungs 85 and 88 must have a minimal cross-sectional dimension at least that of rung 88. The circuit of Fig. 5 comprises windings performing the same operations upon energization by external current sources, not shown, as those described in connection with other embodiments described hereinbefore. The flux distribution shown in Fig. 5 is rearranged upon the application to the input windings of current pulses expressing the input variables $x_1$, $x_2$, and $x_3$ in substantially the same manner as previously described herein by the application of the activating current pulse. Because of the limited flux paths available as evidenced in Fig. 5, only a limited switching of the flux can take place in rung 83, this being read from the figure as substantially a one-quarter reversal. The extent of the latter reversal corresponds to half of a complete flux excursion in the output rung 88, which excursion operates to induce the required output voltage in the output winding representative of the function generated. A subsequent reset current pulse will normally restore the flux distribution to the pattern shown.

The flexibility of the magnetic structure according to the principles of this invention is not limited to the specific embodiments described hereinbefore nor is the flux distribution and its operative rearrangement to be understood as being restricted to the examples shown. Thus, for example, also contemplated as being within the scope of this invention are structures in which flux closures are traced through other predetermined flux limited paths. The particular information handling operation to be performed will normally control the structural configuration and flux distribution of the particular embodiment of this invention. The latter operation will also govern the disposition of input windings and their number on the rungs of the circuit. It should be noted in the latter respect that it may, in some applications, prove advantageous to couple input windings for preventing flux switching to bridging portions of the side rails. Although the same functions can be obtained in accordance with the foregoing description of the operation of this invention, coincident current operation may readily be accomplished by applying the coinciding currents to separate input windings of a single rung. In this manner of operation a single rung may obviously be used to perform a simple AND function.

The availability of particular associated circuit components may also dictate the manner of operating a logic circuit according to this invention. Thus, it has been assumed in the description of the foregoing specific illustrative embodiments that high impedance current sources are available for the introduction of the information input invariables. Where a particular system affords low impedance voltage sources, this invention permits an advantageous means for holding the flux in a rung in its condition of magnetic remanence. If a shorted winding is coupled to a rung, any flux reversal in that rung will induce a corresponding current in the low impedance winding. The resulting field will then be in the direction such as to oppose the flux reversal and only a negligible flux reversal is permitted. By introducing a voltage in the shorted winding of a polarity which opposes the induced current, completion of the flux reversal in the rung may be allowed. Thus, by controlling a voltage applied to the input winding rather than by applying a current thereto, the flux switching, and thereby the introduction of an input variable, may be controlled. In this manner constant current, high impedance sources representing the variables may be replaced by constant voltage, low impedance sources. Advantageously, the output winding of the last rung of the present invention itself presents nearly such a constant voltage, low impedance source with the result that a number of logic elements may conveniently be cascaded.

Accordingly, what have been described are considered to be only illustrative embodiments of the present invention and it is to be understood that numerous other arrangements may be devised by one skilled in the art without departing from its spirit and scope.

What is claimed is:

1. An electrical circuit comprising a magnetic structure comprising a plurality of magnetic elements each having a substantially rectangular hysteresis characteristic and magnetic means for completing flux paths between each of said elements, each of said elements and said magnetic means having substantially the same minimum cross-sectional areas, each of said elements having a normal remanent saturation flux therein, the flux in each of said elements being completed through at least one of the others of said elements, means for partially switching said flux in first elements of said plurality of elements comprising a first winding for at least a second element of said plurality of elements, means including a current source for applying holding currents to said first winding to control flux changes in said second element, a second winding for at least one of said first elements, and means including a second current source for applying a switching current to said second winding; resetting means for subsequently restoring said normal remanent flux in each of said elements, and output means for generating output signals responsive to flux changes in at least one of said first elements.

2. An electrical circuit according to claim 1 in which said resetting means comprises inductive means coupled to said magnetic structure and means including a third current source for applying a resetting current to said inductive means, and in which said output means comprises an output winding inductively coupled to said one of said first elements.

3. An electrical circuit comprising a plurality of magnetic elements each having a substantially rectangular hysteresis characteristic, each of said elements having a remanent saturation flux of a normal polarity therein, a plurality of magnetic means for completing flux paths from each of said elements through each of the others of said elements, each of said elements and each of said magnetic means having substantially the same saturation flux capacity, means for switching at least partially the flux in an input element and an output element of said plurality of elements comprising means for selectively preventing flux switching in the remaining ones of said plurality of elements and means for inducing a switching flux in said input element simultaneously with the prevention of said flux switching in said remaining ones of said elements, means coupled to particular ones of said plurality of magnetic means for subsequently switching the flux in said input and output elements back to said remanent saturation flux of said normal polarity, and means coupled to said output element for generating output signals responsive to said subsequent flux switching.

4. A switching circuit comprising a first and a second plurality of alternating magnetic elements each having a substantially rectangular hysteresis characteristic, magnetic connecting means for completing flux paths from each element of said first plurality of elements through each element of said second plurality of elements, each element of said first and said second plurality of magnetic elements and said magnetic connecting means having substantially the same minimum cross-sectional areas, means for inducing a saturation flux of one polarity in each element of said first plurality of elements, said flux being closed through an adjacent element of said second plurality of elements in the other polarity, an activating winding for one element of said first plurality of elements, an input winding for each except one of said second plurality of elements, means for energizing said input windings in accordance with information input variables to maintain the flux of the associated elements of said second plurality of elements in said other polarity, means for energizing said activating winding to cause at least a partial switch of the polarity of the flux of the said one element of said first plurality of elements and the said one element of said second plurality of elements, and an output winding for said last-mentioned element energized responsive to said switching of said flux for generating an output signal indicative of said information input variables.

5. A switching circuit comprising a first and a second plurality of alternating adjacent magnetic elements each having a substantially rectangular hysteresis characteristic, bridging means for completing flux paths from each element of said first plurality of elements through each element of said second plurality of elements, each element of said first and second plurality of elements and said bridging means being flux limited in substantially the same flux magnitude, the elements of said first plurality of elements having a remanent saturation flux of one polarity therein and the elements of said second plurality of elements having a remanent saturation flux of the other polarity therein, means for switching the polarity of said flux in one element of said second plurality of elements comprising an activating winding for one element of said first plurality of elements, an input winding for each except said one element of said second plurality of elements, means for applying first currents to said input windings in accordance with information input variables to maintain the flux of the associated element of said second plurality of elements in said other polarity, and means for applying a second current to said activating winding substantially simultaneously with the application of said first currents to induce a flux of said other polarity in said one element of said first plurality of elements, said last-mentioned flux being completed through said one element of said second plurality of elements; resetting means for subsequently switching the polarity of said flux in said one element of said second plurality of elements, and an output winding for said last-mentioned element energized responsive to said last-mentioned switching of said flux for generating an output signal indicative of said information input variables.

6. A switching circuit according to claim 5 in which said resetting means comprises windings inductively coupled to predetermined ones of said bridging means and means including a current source for applying a resetting current to said last-mentioned windings.

7. An electrical circuit comprising a magnetic structure having a first and a second plurality of alternating adjacent members and a plurality of magnetic connecting means for magnetically connecting each end of each of said members with each end of each of the others of said members, each of said members and each of said magnetic connecting means being capable of assuming a remanent saturation flux in one or the other direction to only a predetermined flux limit, means inductively coupled to said structure for inducing a normal remanent flux to said flux limit in one direction in each of said first plurality of members to close said last-mentioned members to additional flux in said one direction, said flux in each member of said first plurality of members being completed through a member of said second plurality of members in the other direction, inductive control means for applying magnetomotive forces of said other direction to each except one member of said second plurality of members to close said last-mentioned members to a switching flux in said one direction, activating means for inducing a switching flux in said other direction in one member of said first plurality of members, said switching flux being completed through said one member of said second plurality of members in said one direction to cause a flux reversal in said last-mentioned member, and means coupled to said one member of said second plurality of members for generating output signals responsive to said induction of said normal remanent flux and said flux reversal.

8. An electrical circuit according to claim 7 in which said control means comprises at least one winding inductively coupled to each except said one member of said second plurality of members and means for applying first currents to said windings.

9. An electrical circuit according to claim 8 in which said activating means comprises an activating winding inductively coupled to said one member of said first plurality of members and means for applying a second current to said activating winding simultaneously with said first currents.

10. A switching circuit comprising a magnetic structure comprising a pair of side rails having members transversely disposed in a spaced relationship therebetween, each of said members having a substantially rectangular hysteresis characteristic, each of said side rails and each of said transverse members having substantially the same minimum cross-sectional area, means for inducing a remanent magnetic flux in each of a first plurality of said members in one direction, said flux in each of said last-mentioned members being completed through said side rails and through a member of a second plurality of said members in the other direction, means for preventing flux reversals in each except one of said second plurality of members including at least a first winding inductively coupled to each of said last-mentioned members and means including first current pulse sources for selectively applying current pulses to said first windings in accordance with information input variables, a second winding inductively coupled to one of said first plurality of members, means including a second current pulse source for applying a current pulse to said second winding substantially simultaneously with said current pulses applied to said first windings to induce a switching flux in said other direction in said one of said first plurality of members, said switching flux being completed through said side rails and said one of said second plurality of members in said one direction, and output means including a third winding inductively coupled to at least said one of said second plurality of members for generating output signals responsive to flux reversals in said last-mentioned member indicative of said information variables.

11. A switching circuit according to claim 10 in which said means for inducing said remanent flux in each of said first plurality of said members in said one direction comprises fourth windings inductively coupled to one of said side rails and means including a third current source for applying current pulses to said last-mentioned windings.

12. A switching circuit comprising a magnetic structure comprising a pair of side rails having members transversely disposed in a spaced relationship therebetween, each of said members having a substantially rectangular hysteresis characteristic and each having a predetermined flux limit of substantially the same flux magnitude, a plurality of first windings coupled to one of said side rails between alternating pairs of said members, means including a first current source for applying a first current pulse to said first windings to induce remanent fluxes in one direction in each of alternating first ones of said members, said fluxes being completed respectively through adjacent second ones of said members in the other direction, second windings coupled to each except one of said adjacent second members, a third winding coupled to one of said alternating first members, means including second current sources for applying second current pulses to said second windings in accordance with information input variables to maintain the fluxes in said adjacent second members in said other direction, means including a third current source for applying a third current pulse to said third winding to induce a switching flux in the said one of said alternating first members in the other direction, said switching flux being completed through said one of said adjacent second members to reverse at least partially the flux in said last-mentioned member, and a fourth winding coupled to said last-mentioned member having output voltages induced therein responsive to flux reversals indicative of said information input variables.

13. A switching circuit comprising a magnetic structure comprising a pair of side rails having a sequence of members transversely disposed in a spaced relationship therebetween, each of said members having a substantially rectangular hysteresis characteristic, said side rails and each of said members having substantially equal minimum cross-sectional areas to comprise a plurality of first possible equally limited flux paths between each of said plurality of members and a single second flux path between a first member of said sequence of members and a last member of said sequence of members, inductive means for inducing a remanent saturation flux of a particular direction in particular ones of said paths including each of said members, inductive control means associated with the members except said first member having a remanent saturation flux therein in one direction for blocking said first possible flux paths to a switching flux of the other direction responsive to a particular combination of input conditions, means for inducing a switching flux in said single second flux path to cause a flux reversal in at least said last member, and means associated with said last-mentioned member responsive to said flux reversal for generating an output signal indicative of said particular combination of input conditions.

14. A switching circuit according to claim 13 in which said inductive control means comprises a winding inductively coupled to each of said members except said first member having said remanent saturation flux therein in one direction and means including sources of current pulses for selectively applying input current pulses to said windings representative of said particular combination of input conditions.

15. An electrical circuit comprising a magnetic structure having a plurality of individual members, each of said members having a substantially rectangular hysteresis characteristic, each of said members being magnetically connected at each end with each of the other members by means of side rails, each of said members and each of said side rails having substantially the same minimum cross-sectional areas, a first and a second of said members and portions of said side rails defining a first magnetic flux path, said first and a third of said members and further portions of said side rails defining a second magnetic flux path, means including a reset winding for inducing a flux of one polarity in said first member, said last-mentioned flux being closed through said second member, means including an input winding for blocking said second member to flux of the other polarity, means including an activating winding for inducing a flux of the other polarity in said first member, said last-mentioned flux being closed through said third member, and an output winding coupled to said third member energized responsive to flux changes in said last-mentioned member for generating an output signal.

16. An electrical circuit comprising a magnetic structure defining a pair of equally flux limited side rails having a first and a second member therebetween flux limited to the same extent as said side rails, each of said members having a substantially rectangular hysteresis characteristic, said first and second members and said side rails defining a closed magnetic flux path, a plurality of other members between said side rails, each of said other members also being flux limited to the same extent as said side rails and providing a flux bypass for said second member, means for selectively controlling the magnetic reluctance of each of said other members in accordance with predetermined input conditions, means including an activating winding coupled to said first member for inducing a magnetic flux in said first member, said flux being completed through said second member or said other members as determined by the relative reluctance of said second member and said other members, and an output winding coupled to said second member energized responsive to the completion of said flux through said second member for generating an output signal.

17. An electrical circuit comprising a single magnetic member having side rails, a pair of end rungs between said side rails, and a plurality of intermediate rungs joining said side rails for completing magnetic paths of different lengths from one of said end rungs, each of said paths being flux limited to the same flux magnitude, each of said end and intermediate rungs having a substantially rectangular hysteresis characteristic, means for generating a switching magnetic flux of one polarity in said one end rung, control means including windings on at least certain of said intermediate rungs for blocking the paths completed by said intermediate rungs to said switching magnetic flux, and an output winding in a path including said other end rung.

18. An electrical circuit in accordance with claim 17 also comprising resetting means including windings positioned on said side rails to establish a remanent saturation flux of the other polarity in certain of said intermediate rungs and said one end rung and to establish a remanent saturation flux of said one polarity in others of said intermediate rungs and said other end rung.

19. An electrical circuit in accordance with claim 18 wherein said control means includes windings on said others of said intermediate rungs and means for applying holding currents to said windings to prevent flux reversals in said other intermediate rungs by said flux of said one polarity in said switching one end rung.

References Cited in the file of this patent

UNITED STATES PATENTS

| | | |
|---|---|---|
| 2,519,426 | Grant | Aug. 22, 1950 |
| 2,818,555 | Lo | Dec. 31, 1957 |
| 2,869,112 | Hunter | Jan. 13, 1959 |